(12) United States Patent
Prades et al.

(10) Patent No.: US 8,426,539 B2
(45) Date of Patent: *Apr. 23, 2013

(54) TRANSITION METAL COMPLEXES SUPPORTED ON ACTIVATING SUPPORT

(75) Inventors: Floran Prades, Linz (AT); Roger Spitz, Lyons (FR); Christophe Boisson, Tramoyes (FR); Sabine Sirol, Horrues (BE); Abbas Razavi, Mons (BE)

(73) Assignees: Total Petrochemicals Research Feluy, Seneffe (Feluy) (BE); Centre National de la Research Scientifique (CNRS), Paris (FR)

( * ) Notice: Subject to any disclaimer, the term of this patent is extended or adjusted under 35 U.S.C. 154(b) by 691 days.

This patent is subject to a terminal disclaimer.

(21) Appl. No.: 11/989,744

(22) PCT Filed: Jul. 26, 2006

(86) PCT No.: PCT/EP2006/064675
§ 371 (c)(1),
(2), (4) Date: Sep. 2, 2009

(87) PCT Pub. No.: WO2007/014889
PCT Pub. Date: Feb. 8, 2007

(65) Prior Publication Data
US 2010/0010180 A1  Jan. 14, 2010

(30) Foreign Application Priority Data
Aug. 3, 2005 (EP) .................... 05291670

(51) Int. Cl.
| C08F 4/80 | (2006.01) |
| C08F 4/70 | (2006.01) |
| C08F 4/607 | (2006.01) |
| C08F 4/52 | (2006.01) |

(52) U.S. Cl.
USPC .......... 526/161; 526/172; 526/160; 526/170; 526/169.1; 526/169; 526/127; 526/129; 526/130; 526/137; 526/144; 526/348; 526/348.5; 526/351; 526/352; 502/103; 502/118; 502/119; 502/128

(58) Field of Classification Search .................. 526/161, 526/172; 502/103
See application file for complete search history.

(56) References Cited

U.S. PATENT DOCUMENTS

| 6,184,171 | B1 |  | 2/2001 | Shih | |
| 6,605,561 | B1 | * | 8/2003 | Saudemont et al. | 502/120 |
| 6,664,348 | B2 | * | 12/2003 | Speca | 526/133 |
| 6,900,154 | B2 | * | 5/2005 | McCullough et al. | 502/119 |
| 7,247,594 | B2 | * | 7/2007 | Jayaratne et al. | 502/103 |
| 7,410,927 | B2 | * | 8/2008 | Masino | 502/150 |
| 7,759,271 | B2 | * | 7/2010 | Prades et al. | 502/107 |
| 7,973,115 | B2 | * | 7/2011 | Hillairet et al. | 526/172 |
| 8,110,518 | B2 | * | 2/2012 | Marin et al. | 502/119 |
| 2007/0254800 | A1 | * | 11/2007 | Razavi et al. | 502/103 |
| 2007/0255023 | A1 | * | 11/2007 | Razavi et al. | 526/114 |
| 2007/0255024 | A1 | * | 11/2007 | Razavi et al. | 526/129 |
| 2007/0255025 | A1 | * | 11/2007 | Razavi et al. | 526/129 |
| 2007/0255026 | A1 | * | 11/2007 | Razavi et al. | 526/129 |
| 2007/0255028 | A1 | * | 11/2007 | Razavi et al. | 526/153 |
| 2010/0010180 | A1 | * | 1/2010 | Prades et al. | 526/161 |
| 2010/0179055 | A1 | * | 7/2010 | Prades et al. | 502/167 |

FOREIGN PATENT DOCUMENTS
WO  2005030813 A1  4/2005

* cited by examiner

Primary Examiner — Rip A. Lee

(57) ABSTRACT

The present invention discloses an active supported catalyst system comprising:
a) one or more non-metallocene catalyst component;
b) an alkylating agent;
c) an activating functionalised and fluorinated support.
It also discloses a method for preparing said active support and its use in the polymerisation of polar and non polar monomers.

12 Claims, 7 Drawing Sheets

TRANSITION METAL COMPLEXES SUPPORTED ON ACTIVATING SUPPORT

CROSS-REFERENCE TO RELATED APPLICATIONS

This application claims the benefit of PCT/EP2006/064675, filed Jul. 7, 2006.

This invention relates to the field of olefin polymerisation with metal complexes supported on activating support.

It is known in the art to (co)polymerise ethylene and alpha-olefins in the presence of a catalyst system comprising a metallocene catalyst component and an activating agent. The first developed very active system of that type was based on a zirconocene $Cp_2ZrCl_2$ and an aluminoxane. Further development has led to the preparation of bridged metallocene components, wherein the cyclopentadienyl rings can be substituted in various positions, with substituents of various sizes in order to control the insertion pattern of the growing polymer chain.

The activating agents necessary to activate the metallocene components into catalyst systems are typically based on aluminium or boron, the most commonly used being methylaluminoxane (MAO). MAO however is costly and unstable leading to poor polymer morphology and therefore to reactor fouling and difficult transport conditions.

It is also known in the art to use complexes of Ni, Co, Pd and Fe in the polymerisation of olefins as described for example in WO-96/23010. That document discloses particularly selected a-diimine nickel complexes used in combination with a selected Lewis or Bronsted acid for the copolymerisation of ethylene. The most commonly used activating agent for these complexes is also MAO.

DE-A-19959251 discloses active catalyst systems based on group VIIIB metal complexes.

Diimine nickel dihalide complexes suitable for the homo- or copolymerisation of ethylene are disclosed in EP-A-884331.

U.S. Pat. No. 4,716,208 also discloses a broad variety of late transition metal complexes that are suitable for the polymerisation of olefins and more particularly, Ittel et al. (Ittel S. D., Johnson L. K. and Brookhart M.; in Chem. Rev., 100, 1169, 2000.) disclose late-metal catalysts that can be used in the homo- and copolymerisation of ethylene.

It is known to use activating supports with metallocene catalyst components such as disclosed for example in FR-2769245.

All these catalyst components suffer from the disadvantage that they must be used with activating agents, more preferably with aluminoxane in order to become suitable for polymerising olefins.

There is thus a need to prepare active catalyst systems based on transition metal complexes that require no aluminoxane.

It is an aim of the present invention to prepare active catalyst system based on imine transition metal complexes wherein the activation step is provided by an activating support.

It is another aim of the present invention to prepare catalyst systems for the copolymerisation of olefins with polar comonomer.

It is a further aim of the present invention to prepare polyolefin having a good morphology.

It is an aim of the present invention to prepare active catalyst system produced with either non-metallocene complexes as described above, or non-metallocene (I) to (III) described in patent EP 1 238 989, wherein the activation step is provided by an activating support, which contains a fluorinated aluminium Lewis Acid in combination with an alkylating agent for the non-metallocene compound.

Accordingly, the present invention discloses a catalyst system comprising:

a) a metal-based catalyst component of general formula (I)

wherein Lig is a heteroatom-containing ligand; n is an integer of 1, 2, or 3; M is selected from Ti, Zr, Hf, V, Y, Sc, Nb, Ta, Cr, Mn, Fe, Ru, Co, Rh, Ni, Pd, or a lanthanide metal; each Q is independently a hydrocarbon having 1-20 carbon atoms or a halogen and p is the valence of M minus the sum of the coordination numbers of L.

b) an organo-metallic compound having at least one metal-carbon bond;

c) an activating functionalised and fluorinated support.

Alternatively, the metal-based catalyst component may be a Ziegler-Natta catalyst component or a constrained geometry catalyst component of general formula R'' (Cp)X'MeQ'$_2$ wherein Cp is a substituted or unsubstituted cyclopentadienyl, indenyl or fluorenyl ring, Me is a metal Group 4 of the Periodic Table, X' is a substituted and each Q' is independently halogen or alkyl having from 1 to 20 carbon atoms.

In a preferred embodiment according to the present invention, the non-metallocene coordination complex is represented by formula II

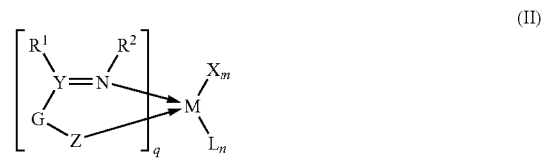

wherein M is Ti, Zr, Hf, V, Cr, Fe, Co, Ni, Pd
wherein $R^1$ and $R^2$ are each independently selected from hydrogen, halogen, substituted or unsubstituted hydrocarbyl, substituted or unsubstituted heterohydrocarbyl or SiR'$_3$ wherein R' is independently selected from hydrogen, halogen, substituted or unsubstituted hydrocarbyl, substituted or unsubstituted heterohydrocarbyl and any adjacent R's may be joined together to form a ring;
wherein Y is C or P(R$^3$);
wherein Z is —O(R$^4$), —C(R$^5$)=O, —O (in which case the bond from O to M is covalent), —C(R$^5$)=N(R$^4$), —P(R$^5$)(R$^6$)=O, —P(R$^5$)(R$^6$) wherein $R^3$, $R^4$, $R^5$, and $R^6$ are independently selected from hydrogen, halogen, substituted or unsubstituted hydrocarbyl, substituted or unsubstituted heterohydrocarbyl or SiR'$_3$ wherein R' is independently selected from hydrogen, halogen, substituted or unsubstituted hydrocarbyl, substituted or unsubstituted heterohydrocarbyl and any adjacent R's may be joined together to form a ring;
wherein G is either a direct bond between Y and Z or is a bridging group that optionally contains a third atom linked to M when q is equal to 1;
wherein L is a group datively bond to M;
wherein X is an atom or group covalently or ionically bound to the transition metal M;
and wherein n is an integer from 0 to 5, m is 1 to 3 and q is 1 or 2.

Preferably, Z is —O or —C(R$^5$)=N(R$^4$).

Preferred complexes according to the present invention can be represented by formulas IIIa, IIIb and IIIc

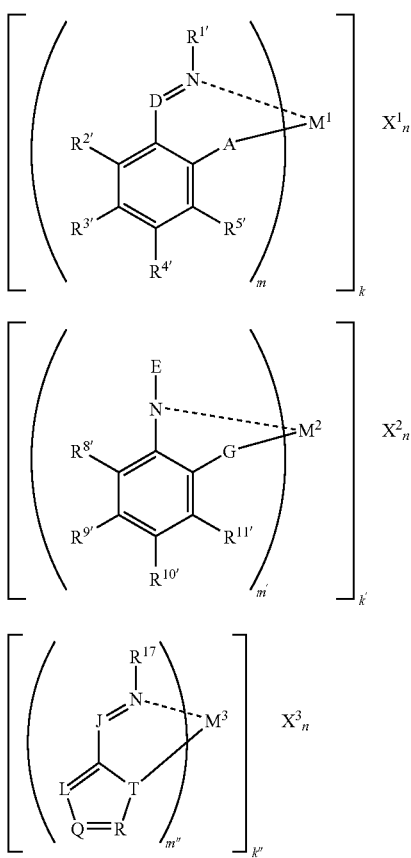

IIIa

IIIb

IIIc wherein all symbols are as disclosed in EP-A-1238989, from page 4, line 32 to page 9, line 17.

Preferably, D is carbon.
Preferably, A is oxygen.
Preferably, G is oxygen.
Preferred R' are selected from hydrogen, t-butyl or phenyl.
Another preferred complex according to the present invention can be represented by formula IV

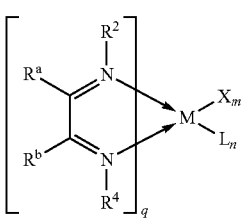

(IV)

wherein M is Ni or Pd;
wherein $R^1$, $R^4$, $R^2$, $R^a$, $R^b$ are each independently selected from hydrogen, halogen, substituted or unsubstituted hydrocarbyl, substituted or unsubstituted heterohydrocarbyl or $SiR'_3$ wherein R' is independently selected from hydrogen, halogen, substituted or unsubstituted hydrocarbyl, substituted or unsubstituted heterohydrocarbyl and any adjacent R's may be joined together to form a ring;
wherherein X represents an atom or group covalently or ionically bound to the transition metal M;
wherein L is a group datively bound to M; and
wherein n is an integer from 0 to 5, m is 1 to 3 and q is 1 or 2.

Another particularly preferred complex according to the present invention can be represented by formula V

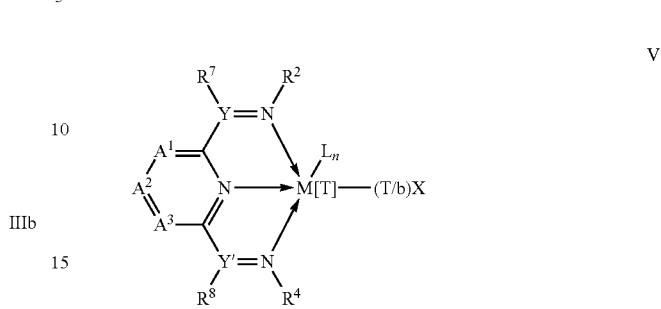

V wherein X, L, n, Y, $R^2$ and $R^4$ are as defined here-above;
wherein Me is Fe or Co;
wherein T is the oxidation state of the transition metal and b is the valence of the atom or group X;
wherein $A^1$, $A^2$ and $A^3$ are each independently N, P or $CR^9$ with the proviso that at least one is $CR^9$;
wherein $R^7$, $R^8$ and $R^9$ are each independently selected from hydrogen, halogen, substituted or unsubstituted hydrocarbyl, substituted or unsubstituted heterohydrocarbyl or $SiR'_3$ wherein R' is independently selected from hydrogen, halogen, substituted or unsubstituted hydrocarbyl, substituted or unsubstituted heterohydrocarbyl.

Preferably, Y is C. Preferably $A^1$ to $A^3$ are each independently $CR^9$, or $A^1$ and $A^3$ are both N and $A^2$ is $CR^9$, or one of $A^1$ or $A^3$ is N and the other two are independently $CR^9$. More preferably $CR^9$ is CH.

Preferably, $R^2$ and $R^4$ are independently selected from substituted or unsubstituted alicyclic, heterocyclic or aromatic groups such as for example phenyl, 1-naphtyl, 2-naphtyl, 2-methylphenyl, 2-ethylphenyl, 2,6-diisopropylphenyl, 2,3-diisopropylphenyl, 2,4-diisopropylphenyl, 2,6-di-n-butylphenyl, 2,6-dimethylphenyl, 2,6-dimethylphenyl, 2,6-dimethylphenyl, 2-di-t-butylphenyl, 2,6-diphenylphenyl, 2,4,6-trimethylphenyl, 2,6-trifluoromethylphenyl, 4-bromo-2,6-dimethylphenyl, 3,5-dichloro-2,6-diethylphenyl, 2,6-bis (2,6-dimethylphenyl)phenyl, cyclohexyl, pyrolyl, 2,5-dimethylpyrolyl and pyridinyl.

The imine transition metal complex is deposited on and reacted with an activating support, wherein said activating support is prepared by the steps of:

a) providing a support prepared from one or more porous mineral oxides;
a) optionally heating the support under inert gas;
b) functionalising the support with a solution containing an alkylating agent;
c) heating the functionalised support of step c) under an inert gas and then under oxygen;
d) fluorinating the support with a solution containing a fluorinating agent;
e) retrieving an active fluorinated support.

Optionally the functionalisation and the fluorination steps can be carried out in one step, before heating step d), by providing an appropriate solution containing a functionalising and fluorinating agent.

The porous mineral oxide is advantageously chosen from silica, alumina and mixtures thereof. Preferably it is silica.

The porous mineral oxide particles preferably have at least one of the following characteristics:

they include pores having a diameter ranging from 7.5 to 30 nm;

they have a porosity ranging from 1 to 4 cm$^3$/g;

they have a specific surface area ranging from 100 to 1000 m$^2$/g; and they have an average diameter ranging from 1 to 100 μm.

Before it is functionalised, the support has —OH radicals on its surface, in particular from 0.25 to 10, and even more preferably from 0.5 to 4 —OH radicals, per nm$^2$ resulting either from a thermal treatment under inert gas at a temperature of from 100 to 1000° C., preferably at a temperature of from 120 to 800° C. and more preferably at a temperature of from 140 to 700° C., during at least 60 minutes or from a chemical treatment. After it has been functionalised, said support has as many at least partially fluorinated aluminium and/or magnesium Lewis-acid sites per nm$^2$.

The support may be of various kinds. Depending on its nature, its state of hydration and its ability to retain water, it may undergo dehydration treatments of greater or lesser intensity depending on the desired surface content of —OH radicals.

Those skilled in the art may determine, by routine tests, the dehydration treatment that should be applied to the support that they have chosen, depending on the desired surface content of —OH radicals.

More preferably, the starting support is made of silica. Typically, the silica may be heated between 100 and 1000° C., preferably between 120 and 800° C., more preferably between 140 and 700° C. under an inert gas atmosphere, such as for example under nitrogen or argon, at atmospheric pressure or under a vacuum of about 10$^{-5}$ bars, for at least 60 minutes. For such heat treatment, the silica may be mixed, for example, with NH$_4$Cl so as to accelerate the dehydration.

Alternatively, the heat treatment can be carried out at a temperature of from 100 to 450° C., in combination with a silanisation treatment. This results in a species derived from silicon being grafted on the surface of the support thereby making said surface more hydrophobic.

The silane may, for example, be an alkoxytrialkylsilane, such as for example methoxytrimethylsilane, or a trialkylchlorosilane, such as for example trimethylchlorosilane or triethylchlorosilane. It is typically applied to the support by forming a suspension of this support in an organic silane solution, said silane solution having a concentration of between 0.1 and 10 mol per mole of OH radicals on the support. The solvent for this solution may be chosen from linear or branched aliphatic hydrocarbons, such as hexane or heptane, alicyclic hydrocarbons, optionally substituted, such as cyclohexane, and aromatic hydrocarbons, such as toluene, benzene or xylene. The treatment of the support by the silane solution is generally carried out under stirring at a temperature of from 50 to 150° C., during 1 to 48 hours.

After silanisation, the solvent is removed, for example, by siphoning or filtration, and the support is then being washed thoroughly, using for example 0.3 l of solvent per gram of support.

The surface —OH radical content of the support may be assayed using known techniques such as, for example, by reacting an organomagnesium compound such as CH$_3$ MgI with the support and by measuring the amount of methane given off as described in McDaniel (McDaniel M. P., in J. Catal., 67, 71, 1981) or by reacting triethylaluminium with the support and by measuring the amount of ethane given off as described by Gachard-Pasquet (Thesis of Veronique Gachard-Pasquet, Universite Claude Bernard, Lyon 1, France, pages 221-224, 1985).

In a first embodiment according to the present invention, functionalisation and fluorination are carried out as two separate steps. The activating supports are then formed by the reaction of —OH radicals carried by the support base particles with at least one functionalisation agent. Any functionalisation agent or mixture thereof described in FR-2,769,245 can be used in the present invention.

In a preferred embodiment of the present invention, the functionalisation step is carried out by treating a suspension of the support particles in a solvent medium containing the functionalisation agent at a temperature ranging from −150 to +150° C. for a period of time ranging from 1 minute to 12 hours, and then by recovering the grafted particles after washing. The solvent is preferably selected from aliphatic, alicyclic and aromatic hydrocarbons. Preferably, the treatment is carried out at a temperature of from 30 to 100° C. and for a period of time of from 1 to 3 hours. Preferably the concentration of functionalisation agent is of from 0.5 to 20 mmol per g of support particles.

After the functionalisation step, a heat treatment in an inert gas (such as argon or nitrogen) is carried out, preferably in a fluidised bed. The heat treatment is used to remove the organic residues present on the surface and created by the functionalisation agent. This heat treatment, or pyrolysis, is advantageously carried out at a temperature of from 200 to 600° C., preferably of from 350 to 500° C. and more preferably of about 450° C., for a period of time of from 1 to 10 hours.

The oxidation treatment may advantageously consist of a heat treatment of the functionalised support particles, in a fluidised bed under oxygen, at a temperature of from 200 to 600° C., preferably of from 350 to 500° C. and more preferably of about 450° C., for a period of time of from 1 to 10 hours. This treatment increases the acidity of the support surface and, consequently, the performance of the catalytic system.

The functionalised support is then treated with a fluorinating agent that partially replaces the radicals of the functionalising agent with fluor. The fluorination treatment may be carried out by bringing the functionalised support particles into contact with gaseous hydrofluoric acid. This contacting step is carried out for a period of time ranging from 1 minute to 24 hours, at a temperature of from 20 to 800° C. Alternatively, hydrofluoric acid may advantageously be replaced by powdered (NH$_4$)$_2$SiF$_6$; the fluorination treatment with (NH$_4$)$_2$ SiF$_6$ is carried out by gently fluidising the mixture of support particles and (NH$_4$)$_2$ SiF$_6$ under an inert gas, such as argon or nitrogen, and by submitting to a heat treatment at a temperature of from 300 to 500° C. for a period of time of from 1 to 10 hours. An amount of fluorine of from 1 to 10% by weight based on the total weight of the support is used for the fluorination treatment. Preferably, the minimum amount of fluorine is 3 wt %. Preferably the maximum amount of fluorine is 7% by weight, more preferably 6 wt % and most preferably 5 wt %.

In a second embodiment according to the present invention, the fluorination step is suppressed and the support is treated with a compound comprising at least one aluminium, one fluor and one organic group, optionally in combination with any one or more compounds selected from M"F, M"R$^p$, M'F$_2$, M'R$^p$F, or M'R$^p{}_2$ wherein M" is a group 1 metal, M' is a group 2 metal and R$^p$ is an alkyl having from 1 to 20 carbon atoms. The organic group is preferably hydrocarbyl and more preferably an alkyl having from 1 to 12 carbon atoms. Preferably, the functionalisation and fluorination agent is of formula (II)

$$Al(R'')_2F \qquad \text{(II)}$$

wherein the R" groups, can be the same or different and are alkyl groups having from 1 to 20 carbon atoms. Preferably, R" is methyl, ethyl, butyl and hexyl, and more preferably the R" groups are the same. The most preferred compound of formula (I) is diethylaluminiumfluoride.

Fluorinated alkylaluminum can be obtained as described in H. Roesky review, *Journal of Fluorinated Chemistry*, 2003, 122, 125.

The functionalisation agent can be used alone or in combination with any one or more groups selected from M"F, M"R$^p$, M'F$_2$, M'R$^p$F or M'R$^p{}_2$ wherein M" is a group 1 metal, preferably Na, M' is a group 2 metal, preferably Mg and R$^p$ is an alkyl having from 1 to 20 carbon atoms.

The functionalised support is then subjected to a thermal treatment and an oxygen treatment similar to that described here-above for the first embodiment.

One or more non-metallocene catalyst components as described in any one of formulae I to V are impregnated on and reacted with the activating support. Alternatively, a mixture of metallocene and non-metallocene components can be deposited on the activating support.

The nature, the size and the position of the substituents determine the structure of the polymer: they are thus selected according to the desired properties and structure of the resulting polymer.

The non-metallocene complexes described here-above can be deposited on conventional supports and activated with conventional activating agents such as aluminoxanes but the activity of these supported catalyst systems remain lower than that of other heterogeneous catalyst systems. The melting temperature however of the polymer is fairly high.

In the present invention, an alkylation step must be carried out in order to create an active catalyst system. The alkylating agent is an organometallic compound or a mixture thereof that is able to transform a metal-halogen bond into a metal-carbon bond. It can be selected from an alkylated derivative of Al, Li or Mg. Preferably, it is selected from an alkylated derivative of aluminium of formula (III)

$$AlR^{\#}{}_n X_{3-n} \qquad \text{(III)}$$

wherein the R$^{\#}$ groups, may be the same or different, and are a substituted or unsubstituted alkyl, containing from 1 to 12 carbon atoms such as for example ethyl, isobutyl, n-hexyl and n-octyl or an alkoxy or an aryl and X is a halogen or hydrogen, n is an integer from 1 to 3, with the restriction that at least one R$^5$ group is an alkyl. Preferably, the alkylating agent is an aluminium alkyl, and more preferably it is triisobutylaluminum (TIBAL) or triethylaluminium (TEAL).

Another preferred alkylating agent is diethyl zinc.

The activating functionalised support, the alkylating agent and the non-metallocene metal complex are added, in any order, to prepare an active catalyst system.

In one embodiment according to the present invention, the alkylating agent is first added to the activating functionalised support. The non-metallocene metal complex is then dissolved in an aromatic solvent and added to the treated support.

In another embodiment according to the present invention, the alkylating agent is mixed with the non-metallocene metal complex and the mixture is added to the activating support.

The amount of alkylating agent is variable and the ratio Al/M is of from 1 to 10000, preferably of from 10 to 2000. The amount of activating support is of from 0.01 to 2000 mg of support per micromole of non-metallocene complex, preferably of from 0.5 to 1000 mg of support per micromole of non-metallocene complex.

The monomers that can be used in the present invention are alpha-olefins, preferably ethylene and propylene. Polars monomers such as functionalised polyolefins and acrylates can also be used.

The polymerisation conditions are not particularly limited and depend upon the monomer and the non-metallocene metal complex. For Brookhaert-type non-metallocene metal complexes, the temperature is of from 0 to 80° C., preferably it is room temperature (about 25° C.) and the pressure defined as the monomer pressure can be from atmospheric up to 100 bars, preferably between 3 and 50 bars.

Hydrogen may be added to the system in order to control the chain length.

When compared to homogeneous polymerisation, the catalyst system of the present invention has the great advantage of leaving the reactor clean. This is due to morphologic reasons: because there is no aluminoxane, there is no loose polymer and the present catalyst system produced no fines.

EXAMPLES

All the experiments were carried out under argon and with the classical Schlenk techniques. Heptane and toluene solvents were dried on a 0.3 nm molecular sieve.

The number average molecular weight Mn, the weight average molecular weight Mw, the polydispersity index Mw/Mn were all determined by Steric Exclusion Chromatography (SEC) with trichlorobenzene (TCB) solvent at 135° C., with polystyrene scaling and with Mark-Houwinck coefficients for polyethylene of K=5.25.10$^{-4}$ and $\alpha$=0.76.

The melting temperatures are measured by Differential Scanning Calorimetry (DSC) method and the density is measured following the method of standard test ASTM 1505 at a temperature of 23° C.

The rate of polymer branching obtained with the Ni and Pd complexes were determined following the method described by Galland et al. (Galland G., de Souza R., Santos Mauler R., Nunes F., in Macromolecules, 32, 1620, 1999).

The polymer morphologies were determined with an electronic microscope if the amount of polymer produced was insufficient to allow granulometric analysis.

Productivities were considered as negligible if they were inferior to 10$^2$ g of (co)polymer per g of catalyst, wherein the weight of catalyst includes the mass of the activating support plus that of the metal complex.

LIST OF FIGURES

Figure 8:
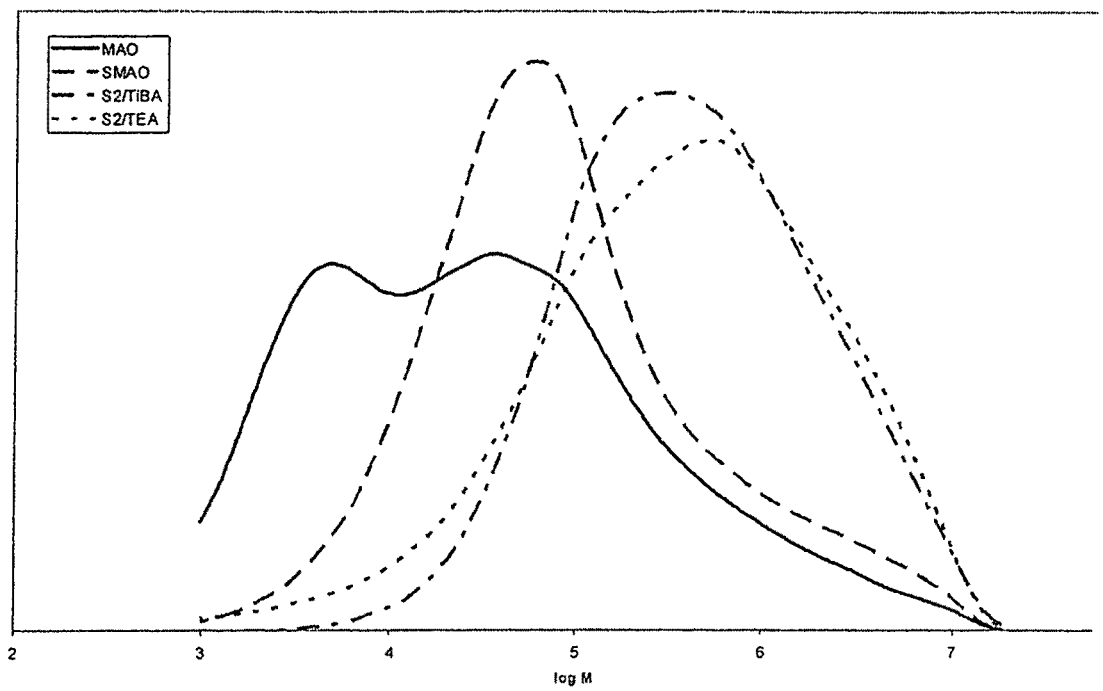

FIG. 8 represents the polydispersity curves of polyethylene prepared with complex C4 and various activating agents, respectively, MAO (example 30), TIBAL (example 31), support S2 and TIBAL (example 33), support S2 and TEAL (example 34).

Figure 9:
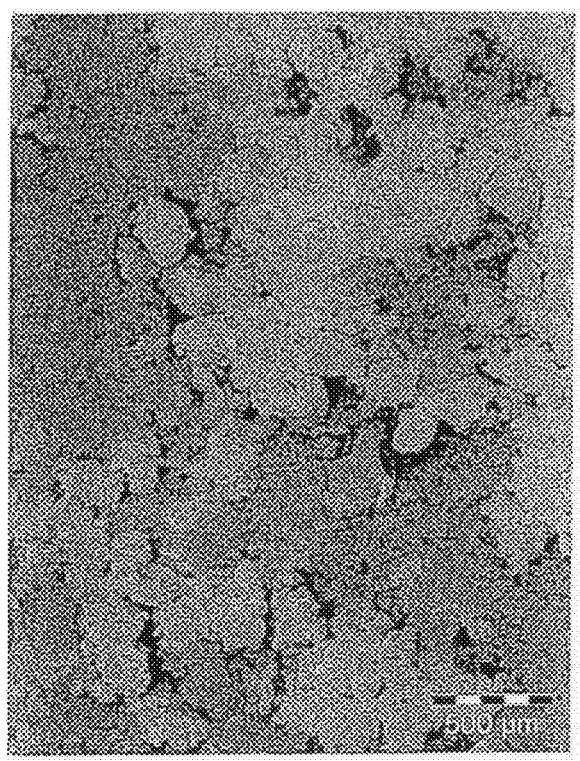

FIG. 9 represents the morphology of polyethylene prepared according to example 38.

Figure 10:

FIG. 10 represents the morphology of polyethylene prepared according to example 39.

Figure 11:
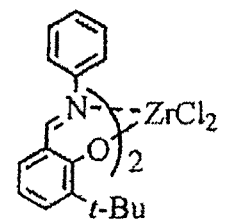

FIG. 11 represents the structure of complex C6 that was used with various activation agents or activating supports for polymerising ethylene.

EXAMPLE 1

Preparation of Activating Support S1

The starting silica was a type 332 Grace Davidson® silica having the following characteristics:
mean particle size=70 μm
mean specific area=300 m$^2$/g
porous volume=1.65 mL/g
apparent density=0.35 g/cm$^3$
Step A:
5 g of the silica were heated under dynamic vacuum (10$^{-2}$ mbars) according to the following temperature scheme:
from 30° C. to 100° C. in one hour;
from 100° C. to 130° C. in 30 minutes;
from 130° C. to 200° C. in one hour;
maintained at 200° C. for four hours.
The resulting silica had an amount of surface silanol of 2.1 mmol/g.
Step B:
The silica was then impregnated with methylaluminoxane (MAO) following a standard procedure. Silica was placed in toluene and MAO was added dropwise, at a temperature of 110° C., and kept under stirring for a period of time of about 4 hours. It was then filtered and washed three times with toluene and three times with pentane. It was dried under reduced atmosphere until constant weight was reached (from 2 to 3 hours).

Elemental analysis of the treated support by atomic emission spectroscopy (Inductively Coupled Plasma) gave 5.72% Al.

EXAMPLE 2

Preparation of Activating Support S2

The starting silica was the same as that of Example 1.
Step A.
5 g of the silica were heated under dynamic vacuum (10$^{-2}$ mbars) according to the following temperature scheme:
from 30° C. to 100° C. in one hour;
from 100° C. to 130° C. in 30 minutes;
from 130° C. to 450° C. in one hour;
maintained at 450° C. for four hours.
The resulting silica had an amount of surface silanol of 1.3 mmol/g.
Step B.
In a 250 cm$^3$ tricol equipped with a mechanical stirrer, 4.31 g of the heated silica were suspended in 30 mL of anhydrous heptane. That suspension was treated with 5.2 mL of a 2.11 M solution of triethylaluminium (TEAL) (11 mmoles), or 1.96 equivalents with respect to silanol, during a period of time of one hour at room temperature (about 25° C.). After one hour, the suspension was decanted to retrieve the supernatant. The product was washed three times with 30 mL of heptane. The impregnated support was then dried under vacuum (10$^{-2}$ mbars) during a period of time of one hour.
Step C.
The impregnated support is then heated under argon in a fluidised bed according to the following temperature scheme:
from 30° C. to 130° C. in one hour;
maintained at 130° C. for one hour;
from 130° C. to 450° C. in one hour;
maintained at 450° C. for four hours.
Step D.
The impregnated support of step C is then heated under oxygen according to the same temperature scheme as step C.
Step E.
The impregnated and heated support is then fluorinated in a fluidised bed. The support is placed in the activator with the equivalent of 10 wt % of fluorination agent (NH$_4$)$_2$SiF$_6$. The support is then heated under argon in a fluidised bed according to the following temperature scheme:
from 30° C. to 450° C. in two hours;
maintained at 450° C. for two hours.

Elemental analysis of the treated support by atomic emission spectroscopy (Inductively Coupled Plasma) gave 4.98% Al and 3.6% F.

EXAMPLE 3

Preparation of Activating Support S3

The starting silica was the same as that of Example 1 and the deshydroxylation step A was the same as in Example 2.
Step B.
In a 250 cm$^3$ tricol equipped with a mechanical stirrer, 2.32 g of the heated silica were suspended in 100 mL of anhydrous heptane. That suspension was treated with 15 mL of a 0.6 M solution in troluene of diethylaluminium fluoride (DEAF), or 3 equivalents with respect to silanol, during a period of time of one hour at room temperature (about 25° C.). 100 mL of toluene were then added and the solution was maintained under stirring for a period of time of 10 minutes. The suspension was then decanted to retrieve the superna. The product was washed three times with 30 mL of heptane. The impregnated support was then dried under vacuum (10$^{-2}$ mbars) during a period of time of one hour.

Elemental analysis of the treated support by atomic emission spectroscopy (Inductively Coupled Plasma) gave 4.56% Al and 2.21% F.

EXAMPLE 4

Preparation of Activating Support S4

The method of preparation of S4 was the same as that used to prepare S3; it was followed by a thermal treatment.
Step C.
The impregnated support is then heated under argon in a fluidised bed according to the following temperature scheme:
from 30° C. to 130° C. in one hour;
maintained at 130° C. for one hour;
from 130° C. to 450° C. in one hour;
maintained at 450° C. for four hours.
Step D.
The impregnated support of step C is then heated under oxygen according to the same temperature scheme as step C.

Elemental analysis of the treated support by atomic emission spectroscopy (Inductively Coupled Plasma) gave 4.56% Al and 2.21% F.

EXAMPLE 5

Preparation of Complex C1

The ligands were prepared following the method disclosed in Dieck et al. (Dieck T., Franz K., Majunke W., Z., in Naturforsch., 30b, 922, 1975).

Ligand bis(2,6-dimethylphenyl)imine of complex C1.

In a 50 mL balloon, 20 mL of pure ethanol were placed with 2.6 mL (29.6 mmoles) of 2,3-butanedione (Aldrich, 99%). To that solution were added 7.4 mL (60 mmoles) of 2,6-dimethylamine (Aldrich, 99%) or 2 equivalents with respect to dicetone. 5 drops of glacial acetic acid were then added. The mixture was heated at reflux during a period of time of four hours. After cooling and filtering of the reaction medium, yellow crystals were obtained. These crystals were washed three times with 20 mL of cold pentane. 5.12 g (16.5 mmoles) of bis(2,6-dimethylphenyl)imine were obtained with a yield of 56%.

The solid was characterised by nuclear magnetic resonance: $^1$H RMN (CDCl$_3$): δ 6.9 (m, 6H, Ar—H), 1.98 (s, 6H, =N-Me), 1.95 (s, 12H, Ar-Me).

Complex C1 was then prepared following the method described in example 28 of WO96/23010.

In a conditioned Schlenk, 20 mL of chloroform distilled on CaH$_2$ were suspended with 1.694 g (5.48 mmoles) of ethylene glycol dimethyl ether of Ni(II) bromide (Aldrich, 97%). In another Schlenk conditioned under argon, 2.156 g (7.37 mmoles) of ligand bis(2,6-dimethylphenyl)imine were placed with 20 mL of dichloroform just distilled on CaH$_2$ or 1.3 equivalents with respect to Ni(II) complex. That solution was syringed into the first Schlenk and the resulting solution immediately turned dark brown. The suspension was kept under stirring during a whole night in the dark. The dark brown complex was let to sediment and the yellow supernatant was retrieved with a syringe. The solid was washed three times with 10 mL of pentane distilled on Na. The light brown solid was then dried under vacuum. 2.5 g of complex C1 were obtained with a yield of 90%.

Elemental analysis of (C$_{20}$H$_{24}$Br$_2$N$_2$Ni) gave the following results:
predicted: % C=47.02; % H=4.73; % N=5.48; % Ni=11.49.
measured: % C=47.10; % H=4.84; % N=5.51; % Ni=11.51.

EXAMPLE 6

Preparation of Complex C1Me$_2$

Complex C1Me$_2$ was prepared following the method disclosed in Dieck and Svoboda (Dieck H., Svoboda M., in J. of Organometallic Chem., 191, 321, 1980).

In a Schlenk conditioned under argon, 277 mg of dark brown complex C1 were placed with 19.85 mL of ether distilled over Na. The Schlenk was placed at a temperature of −80° C. in a bath of liquid acetone/nitrogen. 0.38 mL of CH$_3$MgBr (Aldrich, 3M solution in ether). The color of the suspension turned from dark brown to green and then to blue. The resulting complex was soluble in ether and the solution was kept at a temperature of −80° C. for all further experimentation. When a lower concentration was needed, the complex could be diluted.

The complex was characterised by NMR with the following results: $^1$H NMR (THF d$_8$): δ 7.2 (m, 6H, Ar—H), 2.17 (s, 6H, =N-Me), 1.72 (s, 12H, Ar-Me), 0.5 (s, 3H, Ni-Me), 0.2 (s, 3H, Ni-Me).

EXAMPLE 7

Activation of Complex C1 with Triethylaluminium (TEAL)

In a 1 L balloon, conditioned under argon, to 351.97 mL of heptane, 0.56 mL of TEAL solution (1.252M in heptane) were added. 1.61 mL of a suspension of complex C1, (1.089M in toluene), corresponding to 5 µmol/L, were syringed in the balloon. The medium turned blue and kept the same color during polymerisation. The medium was kept under manual stirring during a period of time of 5 minutes at room temperature (about 25° C.) and then syringed into a 500 mL Büchi type reactor.

The polymerisation was carried out at a temperature of 25° C. under a pressure of ethylene of 3 bars and during a period of time of 60 minutes.

No polymer was obtained.

EXAMPLE 8

Activation of Complex C1 with Triisobutylaluminum (TIBAL)

In a 1 L balloon, conditioned under argon, to 307.47 mL of heptane, 0.27 mL of TIBAL solution (1.112M in heptane) were added. 1.40 mL of a suspension of complex C1, (1.089M in toluene), corresponding to 5 µmol/L, were syringed in the balloon. The medium did not turn blue, contrary to that of example 7. The medium was kept under manual stirring during a period of time of 5 minutes at room temperature (about 25° C.) and then syringed into a 500 mL Büchi type reactor.

The polymerisation was carried out at a temperature of 25° C. under a pressure of ethylene of 3 bars and during a period of time of 60 minutes.

No polymer was obtained.

EXAMPLE 9

Activation of Complex C1 with TEAL and AlF$_3$

In a 50 mL balloon, conditioned under argon, 13 mg of AlF$_3$ were weighted (Strem, anhydrous, 99%).

In a 1 L balloon, conditioned under argon, to 358.13 mL of heptane, 0.29 mL of TEAL solution (1.252M in heptane) were added. One part of that solution corresponding to 1 mmol of TEAL per liter were used to suspend the 13 mg of AlF$_3$. 1.64 mL of a suspension of complex C1, (1.089M in toluene), corresponding to 5 µmol/L, were syringed in the balloon.

The medium was kept under manual stirring during a period of time of 5 minutes at room temperature (about 25° C.) and then syringed into a 500 mL Büchi type reactor.

The polymerisation was carried out at a temperature of 25° C. under a pressure of ethylene of 3 bars and during a period of time of 60 minutes.

The polymer was filtered, washed with methanol and dried under vacuum. 600 mg of polymer were obtained corresponding to an activity of 46 g/g$_{support}$/h and had it the following characteristics:
no morphology
a melting temperature Tm=121° C.
crystallinity=39%.

EXAMPLE 10

Activation of Complex C1 with MAO

In a 1 L balloon, conditioned under argon, to 305.42 mL of heptane, 1 mL of MAO solution (Albemarle, 10 wt % in toluene) were added. 0.85 mL of a suspension of complex C1, (1.789M in toluene), corresponding to 5 µmol/L, were syringed in the balloon. The medium was kept under manual stirring during a period of time of 5 minutes at room temperature (about 25° C.) and then syringed into a 500 mL Büchi type reactor.

The polymerisation was carried out at a temperature of 25° C. under a pressure of ethylene of 3 bars and during a period of time of 60 minutes.

The polymer was filtered, washed with methanol and dried under vacuum. 2 g of polymer were obtained corresponding to an activity of $1.5 \; 10^6$ g/mol$_{Ni}$/h and it had the following characteristics:
Mw=560000
D=3.8
Tm=122° C.
crystallinity=41%
methyl/1000C=11

EXAMPLE 11

Activation of Complex C1 with Support S1

In a 50 mL balloon, conditioned under argon, 58.7 mg of support S1 were weighted.

In a 1 L balloon, conditioned under argon, to 313.91 mL of heptane, 0.22 mL of TEAL solution (1.252 M in heptane) were added. One part of that solution corresponding to 1 mmol of TEAL per liter were used to suspend the 58.7 mg of support S1. 0.62 mL of a suspension of complex C1, (2.410 mM in toluene), corresponding to 5 µmol/L, were syringed in the balloon.

The medium was kept under manual stirring during a period of time of 5 minutes at room temperature (about 25° C.) and then syringed into a 500 mL Büchi type reactor.

The polymerisation was carried out at a temperature of 25° C. under a pressure of ethylene of 3 bars and during a period of time of 60 minutes.

Figure 1:
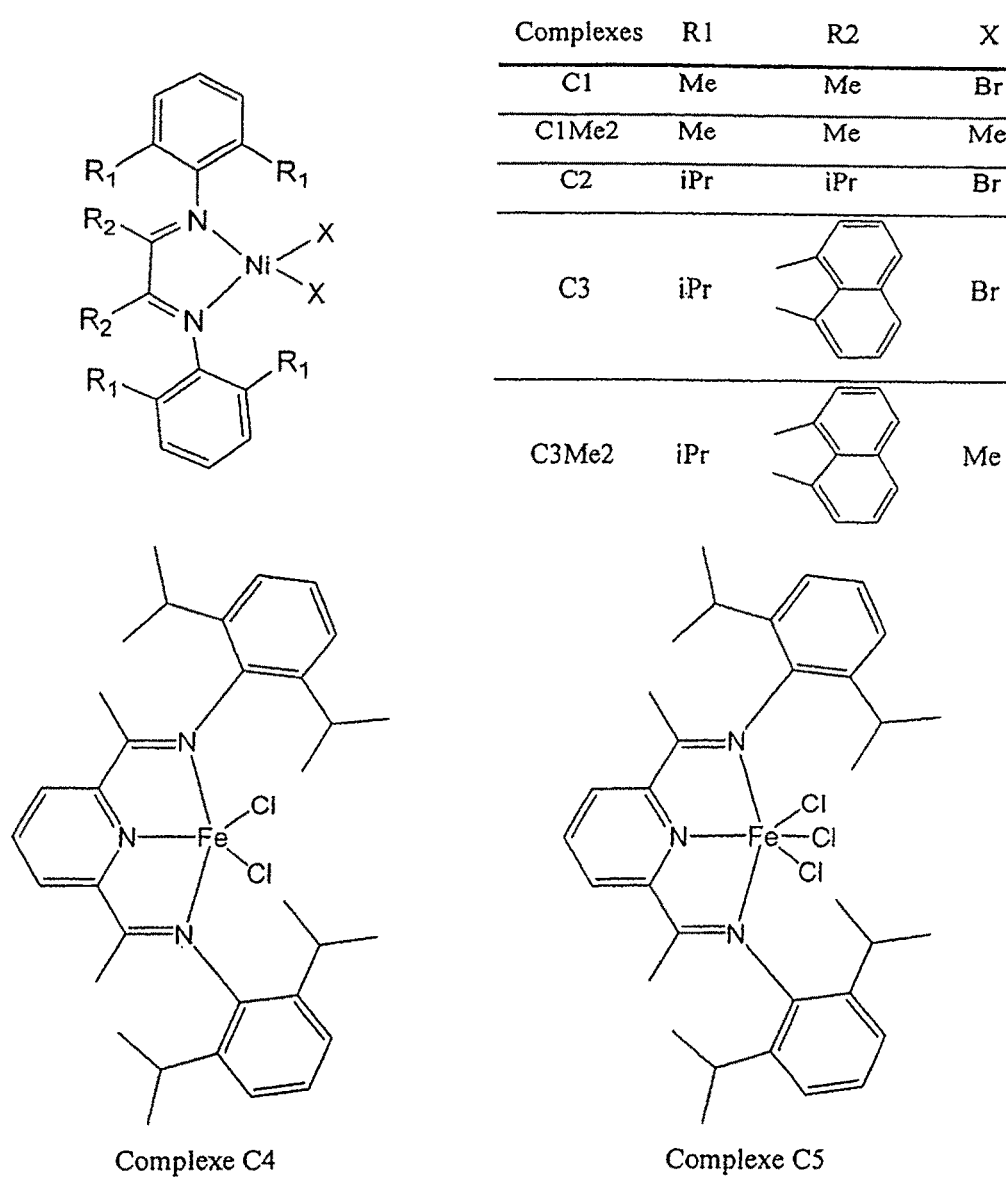
FIG. 1 represents the structures of complexes C1, C1Me$_2$, C2, C3 and C3Me$_2$ that were used with various activation agents or activating supports for polymerising ethylene.
Figure 2:
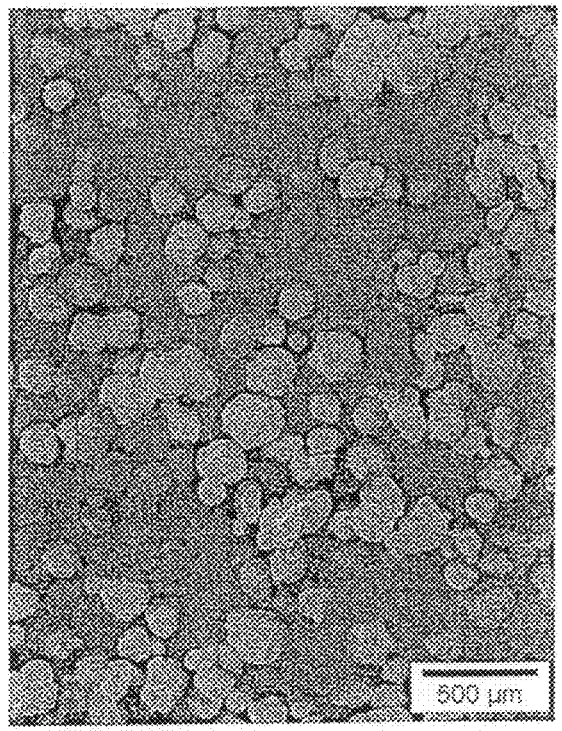
FIG. 2 represents the morphology of polyethylene prepared according to example 11.

The polymer was filtered, washed with methanol and dried under vacuum. 1.17 g of polymer were obtained corresponding to an activity of 20 g/g$_{support}$/h and it had the following characteristics:
Mw=341000
D=3.6
Tm=127° C.
crystallinity=35%
methyl/1000C=13
morphology represented in FIG. 2

EXAMPLE 12

Activation of Complex C1 with Support S3

In a 50 mL balloon, conditioned under argon, 103 mg of support S3 were weighted.

In a 1 L balloon, conditioned under argon, to 342.16 mL of heptane, 0.43 mL of TEAL solution (1.6 M in heptane) were added. One part of that solution corresponding to 2 mmol of TEAL per liter were used to suspend the 103 mg of support S3. The suspension is then syringed into the balloon. 0.84 mL of a solution of complex C1, corresponding to 5 µmol/L, were syringed in the balloon. The medium was kept under manual stirring during a period of time of 5 minutes at room temperature (about 25° C.) and then syringed into a 500 mL Büchi type reactor.

The polymerisation was carried out at a temperature of 25° C. under a pressure of ethylene of 3 bars and during a period of time of 60 minutes.

No polymer was obtained.

EXAMPLE 13

Activation of Complex C1 with TEAL and Support S2

In a 50 mL balloon, conditioned under argon, 51 mg of support S2 were weighted.

In a 1 L balloon, conditioned under argon, to 341.58 mL of heptane, 0.34 mL of TEAL solution (1.112 M in heptane) were added. One part of that solution corresponding to 1 mmol of TEAL per liter were used to suspend the 51 mg of support S2. 0.47 mL of a suspension of complex C1, (3.6 mM in toluene), corresponding to 5 µmol/L, were syringed in the balloon. Support S2 turned blue and the supernatant was clear and remained clear during polymerisation.

The medium was kept under manual stirring during a period of time of 5 minutes at room temperature (about 25° C.) and then syringed into a 500 mL Büchi type reactor.

The polymerisation was carried out at a temperature of 25° C. under a pressure of ethylene of 3 bars and during a period of time of 60 minutes.

Figure 3:
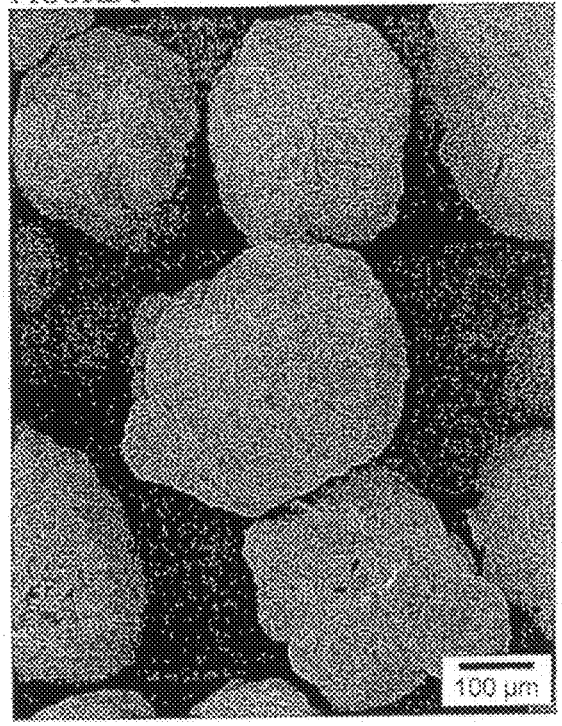
FIG. 3 represents the morphology of polyethylene prepared according to example 13.

The polymer was filtered, washed with methanol and dried under vacuum. 5.7 g of polymer were obtained corresponding to an activity of 111 g/g$_{support}$/h and it had the following characteristics:
Mw=340000
D=3.4
Tm=126° C.
crystallinity=44%
methyl/1000C=16
morphology represented in FIG. 3

EXAMPLE 14

Activation of Complex C1Me$_2$ with TIBAL and Support S2

In a 50 mL balloon, conditioned under argon, 101 mg of support S2 were weighted into which 1.12 mL of a suspension of complex C1Me$_2$ (1.465 mM in ether) were syringed. The support turned mauve.

In a 1 L balloon, conditioned under argon, to 329.87 mL of heptane, 0.26 mL of TIBAL solution (1.28 M in heptane) were added. One part of that solution corresponding to 1 mmol of TIBAL per liter were used to suspend the 101 mg of support S2.

The medium was kept under manual stirring during a period of time of 5 minutes at room temperature (about 25° C.) and then syringed into a 500 mL Büchi type reactor.

The supernatant was clear and remained clear during polymerisation.

The polymerisation was carried out at a temperature of 25° C. under a pressure of ethylene of 3 bars and during a period of time of 60 minutes.

The polymer was filtered, washed with methanol and dried under vacuum. 5.7 g of polymer were obtained corresponding to an activity of 48 g/g$_{support}$/h and it had the following characteristics:

Mw=322000
D=2.8
Tm=127° C.
crystallinity=44%
methyl/1000C=18

EXAMPLE 15

Activation of Complex C1Me$_2$ with TIBAL and Support S2

In a 50 mL balloon, conditioned under argon, 42 mg of support S2 were weighted into which 1.5 mL of a suspension of complex C1Me$_2$ (1.13 mM in ether), corresponding to 5 µmol per liter were syringed. The support turned mauve.

In a 1 L balloon, conditioned under argon, to 330.01 mL of heptane, 0.37 mL of TIBAL solution (0.91 M in heptane) were added. One part of that solution corresponding to 1 mmol of TIBAL per liter were used to suspend the 42 mg of support S2. 5 mL of 1-hexene, dried over CaH2 (Acros, 97%) were then injected. The medium was kept under manual stirring during a period of time of 5 minutes at room temperature (about 25° C.) and then syringed into a 500 mL Büchi type reactor.

The supernatant was clear and remained clear during polymerisation. The copolymerisation ethylene-hexene was carried out at a temperature of 25° C. under a pressure of ethylene of 3 bars and during a period of time of 60 minutes. The polymer was filtered, washed with methanol and dried under vacuum. 5.7 g of polymer were obtained corresponding to an activity of 48 g/g$_{support}$/h and it had the following characteristics:
Mw=324000
D=3.2
Tm=125° C.
crystallinity=43%
methyl/1000C=19

EXAMPLE 16

Activation of Complex C1 with Diethylzinc (DEZ) and Support S2

In a 50 mL Schlenck conditioned under argon, 1 mL solution of a 10% by weight of DEZ in hexane (Strem) was added to a 2 mL solution of complex C1 in toluene (C1 solution at [Ni]=3.2 mM). In a 50 mL balloon conditioned under argon, 1 mL of this blue solution was added to 94 mg of support S2; S2 support turned pink and remaining liquid was colorless. The full suspension was syringed in a 1 L balloon conditioned under argon with 300 mL of heptane.

The overall medium was kept under manual stirring during a period of time of 5 minutes at room temperature (about 25° C.) and then syringed into a 500 mL Büchi type reactor.

The polymerisation was carried out at a temperature of 25° C. under a pressure of ethylene of 3 bars and during a period of time of 60 minutes.

The polymer was filtered, washed with methanol and dried under vacuum. 7.2 g of polymer were obtained corresponding to an activity of 77 g/g$_{support}$/h and it had the following characteristics:
Mw=330000
D=4
Tm=122° C.
crystallinity=40%
methyl/1000C=7
average polymer particles diameter=176 µm.

EXAMPLE 17

Activation of Complex C1 with Diethylzinc (DEZ) and Support S2

In a 50 mL Schlenck conditioned under argon, 1.17 mL solution of a 10% by weight of DEZ in hexane (Strem) was added to a 2 mL solution of complex C1 in toluene (C1 solution at [Ni]=2.9 mM). In a 50 mL balloon conditioned under argon, 1.4 mL of this blue solution was added to 180 mg of support S2; S2 support turned pink and remaining liquid was colorless. The full suspension was syringed in a 1 L balloon conditioned under argon with 500 mL of heptane In a 1 L balloon, conditioned under argon, to 500 mL of heptane were added to which the content of the other balloon was syringed.

The medium was kept under manual stirring during a period of time of 5 minutes at room temperature (about 25° C.) and then syringed into a 1 L Büchi type reactor.

The polymerisation was carried out at a temperature of 60° C. under a pressure of ethylene of 10 bars and during a period of time of 60 minutes.

The polymer was filtered, washed with methanol and dried under vacuum. 10.98 g of polymer were obtained corresponding to an activity of 97 g/g$_{support}$/h and it had the following characteristics:
Mn=46000
Mw=132000
D=2.9
Tm=117° C.
crystallinity=28%
methyl/1000C=30.

EXAMPLE 18

Preparation of Complex C2

The ligand was prepared following the method described in Dieck et al. (Dieck T., Franz K., Majunke W., Z., in Naturforsch., 30b, 922, 1975).

Ligand bis(2,6-diisopropylphenyl)imine of complex C2.

In a 50 mL balloon, 40 mL of pure ethanol were placed with 2 mL (22.8 mmoles) of 2,3-butanedione (Aldrich, 99%). To that solution were added 10.6 mL (56 mmoles) of 2,6-diisopropylaniline (Aldrich, 97%) or 2.4 equivalents with respect to dicetone. 5 drops of glacial acetic acid were then added. The mixture was heated at reflux during a whole night. After cooling and filtering of the reaction medium, yellow crystals were obtained. These crystals were washed three times with 20 mL of cold pentane. 5.5 g (13.5 mmoles) of bis(2,6-diisopropylphenyl)imine were obtained with a yield of 59%.

The solid was characterised by nuclear magnetic resonance: $^1$H RMN (CDCl$_3$): δ 7.1 (m, 6H, Ar—H), 2.73 (sept, 4H, CHMe$_2$), 2.09 (s, 6H, =N-Me), 1.23 (d, 24H, CHMe$_2$).

Complex C1 was then prepared following the method described in example 28 of WO96/23010.

In a conditioned Schlenk, 20 mL of chloroform distilled on CaH$_2$ were suspended with 840 mg (2.72 mmoles) of ethylene glycol dimethyl ether of Ni(II) bromide (Aldrich, 97%). In another Schlenk conditioned under argon, 1.213 g (2.99 mmoles) of ligand bis(2,6-diisopropylphenyl)imine were placed with 20 mL of dichloroform just distilled on CaH$_2$ or 1.09 equivalents with respect to Ni(II) complex. That solution was syringed into the first Schlenk and the resulting solution immediately turned dark brown. The suspension was kept under stirring during a whole night in the dark. The dark brown complex was let to sediment and the light yellow supernatant was retrieved with a syringe. The solid was washed three times with 10 mL of pentane distilled on Na. The light brown solid was then dried under vacuum. 1.62 g of complex C2 were obtained with a yield of 96%.

Elemental analysis of ($C_{28}H_{40}Br_1N_2Ni$) gave the following results:
predicted: % C=62.95; % H=7.55; % N=5.25; % Ni=10.99.
measured: % C=63.01; % H=7.86; % N=5.26; % Ni=11.

EXAMPLE 19

Activation of Complex C2 with MAO

In a 1 L balloon, conditioned under argon, to 323.87 mL of heptane, 1 mL of MAO solution (Albemarle, 10 wt % in toluene) were added. 1.64 mL of a suspension of complex C2, (0.986M in toluene), corresponding to 5 µmol/L, were syringed in the balloon. The medium was kept under manual stirring during a period of time of 5 minutes at room temperature (about 25° C.) and then syringed into a 500 mL Büchi type reactor.

The polymerisation was carried out at a temperature of 25° C. under a pressure of ethylene of 3 bars and during a period of time of 60 minutes.

The polymer was filtered, washed with methanol and dried under vacuum. 800 mg of polymer were obtained corresponding to an activity of $4.94 \; 10^5$ g/mol$_{Ni}$/h and it had the following characteristics:
Mw=686000
D=4.7
Tm=73° C.
crystallinity=3%

EXAMPLE 20

Activation of Complex C2 with Support S2

In a 50 mL balloon, conditioned under argon, 96 mg of support S2 were weighted.

In a 1 L balloon, conditioned under argon, to 326.65 mL of heptane, 0.34 mL of TEAL solution (1.63 M in heptane) were added. One part of that solution corresponding to 1 mmol of TEAL per liter were used to suspend the 96 mg of support S2. 0.62 mL of a suspension of complex C2, (0.986 mM in toluene), corresponding to 5 µmol/L, were syringed in the balloon.

Support S2 turned a blue/green color. The supernatant was clear and remained clear during polymerisation.

The medium was kept under manual stirring during a period of time of 5 minutes at room temperature (about 25° C.) and then syringed into a 500 mL Büchi type reactor.

The polymerisation was carried out at a temperature of 25° C. under a pressure of ethylene of 3 bars and during a period of time of 60 minutes.

The polymer was filtered, washed with methanol and dried under vacuum. 650 mg of polymer were obtained corresponding to an activity of 7 g/g$_{support}$/h and it had the following characteristics:
Mw=1569000
D=3.4
Tm=107° C.
crystallinity=12%

EXAMPLE 21

Preparation of Complex C3

The ligand was prepared following the method described in Dieck et al. (Dieck T., Franz K., Majunke W., Z., in Naturforsch., 30b, 922, 1975).

Ligand of Complex C3.

In a 50 mL balloon, 20 mL of pure ethanol were placed with 4.004 g (21.9 mmoles) of acenaphthenequinone (Acros, 95%). To that solution were added 9.2 mL (74.7 mmoles) of 2,6-diisopropylaniline (Aldrich, 97%) or 3.4 equivalents with respect to dicetone. 5 drops of glacial acetic acid were then added. The mixture was heated at reflux during a whole night. After cooling and filtering of the reaction medium, orange powder was obtained. The powder was washed three times with 20 mL of cold pentane. 5.48 g (10.9 mmol) of bis(2,6-diisopropylphenyl)imine were obtained with a yield of 49%.

The solid was characterised by nuclear magnetic resonance: $^1$H RMN (CDCl$_3$): δ 7.9 (d, 4H, ortho and para An-H), 7.4 (m, 6H, Ar—H), 6.66 (d, 2H, meta An-H), 3.05 (sept, 4H, CHMe$_2$), 1.1 (dd, 24H, CHMe$_2$)

Complex C3 was then prepared following the method described in example 31 of WO96/23010.

In a conditioned Schlenk, 20 mL of chloroform distilled on CaH$_2$ were suspended with 1.210 g (3.92 mmoles) of ethylene glycol dimethyl ether of Ni(II) bromide (Aldrich, 97%). In another Schlenk conditioned under argon, 2.010 g (4.01 mmol) of ligand were placed with 20 mL of dichloroform just distilled on CaH$_2$ or 1.02 equivalents with respect to Ni(II) complex. That orange solution was syringed into the first Schlenk and the resulting solution immediately turned red. The suspension was kept under stirring during a whole night in the dark. The brown/red complex was let to sediment and the light red supernatant was retrieved with a syringe. The solid was washed three times with 10 mL of pentane distilled on Na. The brown/red solid was then dried under vacuum. 2.42 g of complex C3 were obtained with a yield of 86%.

Elemental analysis of ($C_{36}H_{40}Br_2N_2Ni$) gave the following results:
predicted: % C=60.12; % H=5.61; % N=3.89; % Ni=8.16.
measured: % C=60.3; % H=5.7; % N=3.9; % Ni=8.17.

EXAMPLE 22

Preparation of Complex C3Me$_2$

Complex C3Me$_2$ was prepared following the method disclosed in Dieck and Svoboda (Dieck H., Svoboda M., in J. of Organometallic Chem., 191, 321, 1980).

In a Schlenk conditioned under argon, 200 mg of dark brown complex C3Me$_2$ were placed with 32.64 mL of ether distilled over Na. The Schlenk was placed at a temperature of −80° C. in a bath of liquid acetone/nitrogen. 0.23 mL of CH$_3$MgBr (Aldrich, 3M solution in ether). The color of the suspension turned from dark brown to green and then to violet. The resulting complex was soluble in ether and the solution was kept at a temperature of −80° C. for all further experimentation. When a lower concentration was needed, the complex could be diluted.

EXAMPLE 23

Activation of Complex C3 with MAO

In a 1 L balloon, conditioned under argon, to 363.69 mL of heptane, 1.21 mL of MAO solution (Albemarle, 10 wt % in toluene) were added. 2.22 mL of a suspension of complex C, (0.818 M in toluene), corresponding to 5 μmol/L, were syringed in the balloon. The medium was kept under manual stirring during a period of time of 5 minutes at room temperature (about 25° C.) and then syringed into a 500 mL Büchi type reactor.

The polymerisation was carried out at a temperature of 25° C. under a pressure of ethylene of 3 bars and during a period of time of 60 minutes.

The polymer was filtered, washed with methanol and dried under vacuum. 1.023 g of polymer were obtained corresponding to an activity of $1.93 \ 10^6$ g/mol$_{Ni}$/h and it had the following characteristics:
Mw=699000
D=3.1
Tm=88° C.
crystallinity=9%
methyl/1000 C=100.

EXAMPLE 24

Activation of Complex C3 with Support S1

In a 50 mL balloon, conditioned under argon, 56.7 mg of support S1 were weighted.

In a 1 L balloon, conditioned under argon, to 314.9 mL of heptane, 0.22 mL of TEAL solution (1.252 M in heptane) were added. One part of that solution corresponding to 1 mmol of TEAL per liter were used to suspend the 56.7 mg of support S1. 0.7 mL of a suspension of complex C3, (2.195 mM in toluene), corresponding to 5 μmol/L, were syringed in the balloon.

The medium was kept under manual stirring during a period of time of 5 minutes at room temperature (about 25° C.) and then syringed into a 500 mL Büchi type reactor.

The polymerisation was carried out at a temperature of 25° C. under a pressure of ethylene of 3 bars and during a period of time of 60 minutes.

Figure 4:
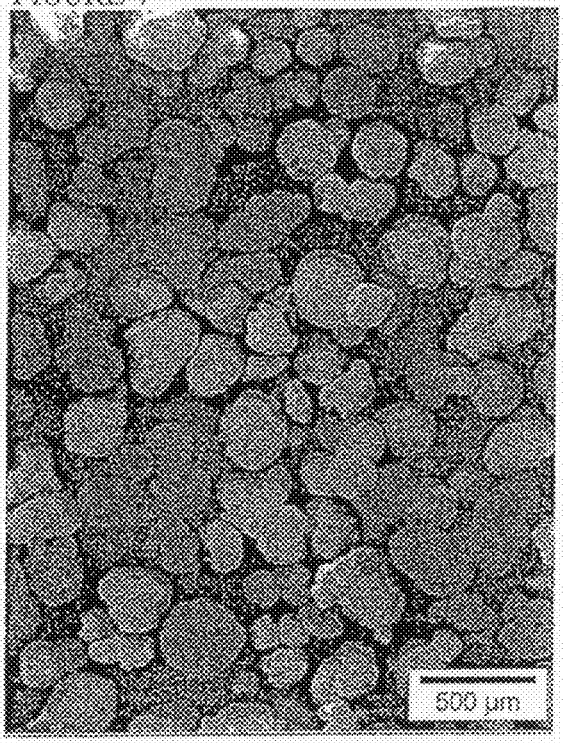
FIG. 4 represents the morphology of polyethylene prepared according to example 24.

The polymer was filtered, washed with methanol and dried under vacuum. 1.77 g of polymer were obtained corresponding to an activity of 32 g/g$_{support}$/h and it had the following characteristics:
Mw=920000
D=3.5
Tm=117° C.
crystallinity=25%
methyl/1000 C=39
morphology represented in FIG. 4.

EXAMPLE 25

Activation of Complex C3 with TEAL and with Support S2

In a 50 mL balloon, conditioned under argon, 102 mg of support S2 were weighted.

In a 1 L balloon, conditioned under argon, to 309.37 mL of heptane, 0.22 mL of TEAL solution (1.252 M in heptane) were added. One part of that solution corresponding to 1 mmol of TEAL per liter were used to suspend the 102 mg of support S2. 0.7 mL of a suspension of complex C3, (2.195 mM in toluene), corresponding to 5 μmol/L, were syringed in the balloon.

Support S2 turned blue and the supernatant was clear and remained clear during polymerisation.

The medium was kept under manual stirring during a period of time of 5 minutes at room temperature (about 25° C.) and then syringed into a 500 mL Büchi type reactor.

The polymerisation was carried out at a temperature of 25° C. under a pressure of ethylene of 3 bars and during a period of time of 60 minutes.

The polymer was filtered, washed with methanol and dried under vacuum. 1.12 g of polymer were obtained corresponding to an activity of 11 g/g$_{support}$/h and it had the following characteristics:
Mw=770000
D=3.7
Tm=116° C.
crystallinity=20%
methyl/1000C=46

EXAMPLE 26

Activation of Complex C3 with TIBAL and Support S2

In a 50 mL balloon, conditioned under argon, 98 mg of support S2 were weighted.

In a 1 L balloon, conditioned under argon, to 313.62 mL of heptane, 0.22 mL of TIBAL solution (1.28 M in heptane) were added. One part of that solution corresponding to 1 mmol of TIBAL per liter was used to suspend the 98 mg of support S2. 0.7 mL of a suspension of complex C3, (2.195 mM in toluene), corresponding to 5 μmol/L, were syringed in the balloon.

The medium was kept under manual stirring during a period of time of 5 minutes at room temperature (about 25° C.) and then syringed into a 500 mL Büchi type reactor.

The polymerisation was carried out at a temperature of 25° C. under a pressure of ethylene of 3 bars and during a period of time of 60 minutes.

The polymer was filtered, washed with methanol and dried under vacuum. 0.8 g of polymer were obtained corresponding to an activity of 9 g/g$_{support}$/h and it had the following characteristics:
Mw=775000
D=3.8
Tm=114° C.
crystallinity=9%

EXAMPLE 27

Activation of Complex C3Me$_2$ with TEAL and Support S2

In a 50 mL balloon, conditioned under argon, 101 mg of support S2 were weighted into which 0.18 mL of a violet suspension of complex C3Me$_2$ (0.846 mM in ether) were syringed.

In a 1 L balloon, conditioned under argon, to 315.08 mL of heptane, 0.23 mL of TEAL solution (1.252 M in heptane) were added. One part of that solution corresponding to 1 mmol of TEAL per liter were used to suspend the 101 mg of support S2, impregnated with complex C3Me$_2$.

Support S2 turned mauve. The supernatant was colorless and remained colorless during polymerisation.

The medium was kept under manual stirring during a period of time of 5 minutes at room temperature (about 25° C.) and then syringed into a 500 mL Büchi type reactor.

The supernatant was clear and remained clear during polymerisation.

The polymerisation was carried out at a temperature of 25° C. under a pressure of ethylene of 3 bars and during a period of time of 60 minutes.

Figure 5:
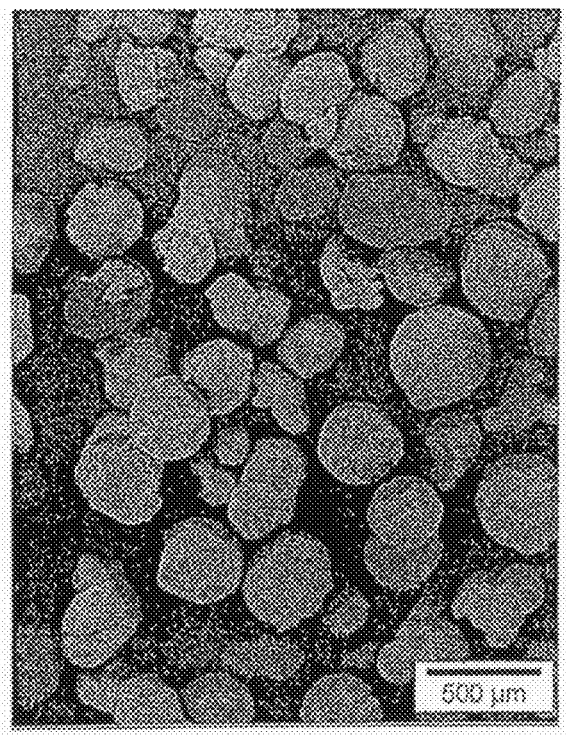
FIG. 5 represents the morphology of polyethylene prepared according to example 27.

The polymer was filtered, washed with methanol and dried under vacuum. 7.345 g of polymer were obtained corresponding to an activity of 73 g/g$_{support}$/h and it had the following characteristics:
Mw=781000
D=3.9
Tm=113° C.
crystallinity=26%
morphology represented in FIG. 5.

EXAMPLE 28

Activation of Complex C3Me$_2$ with TIBAL and Support S2

In a 50 mL balloon, conditioned under argon, 108 mg of support S2 were weighted into which 0.19 mL of a violet suspension of complex C3Me$_2$ (0.846 mM in ether) were syringed.

In a 1 L balloon, conditioned under argon, to 308.49 mL of heptane, 0.24 mL of TIBAL solution (1.28 M in heptane) were added. One part of that solution corresponding to 1 mmol of TIBAL per liter were used to suspend the 108 mg of support S2.

Support S2 turned mauve. The supernatant was colorless and remained colorless during polymerisation.

The medium was kept under manual stirring during a period of time of 5 minutes at room temperature (about 25° C.) and then syringed into a 500 mL Büchi type reactor.

The supernatant was clear and remained clear during polymerisation.

The polymerisation was carried out at a temperature of 25° C. under a pressure of ethylene of 3 bars and during a period of time of 60 minutes.

The polymer was filtered, washed with methanol and dried under vacuum. 4.27 g of polymer were obtained corresponding to an activity of 40 g/g$_{support}$/h and it had the following characteristics:
Mw=767000
D=3.6
Tm=114° C.
crystallinity=26%
methyl/1000C=45.

EXAMPLE 29

Preparation of Complex C4

Ligand 2,6-bis[1-(2,6-bis(isopropyl)phenyl)imido)ethyl] pyridine was prepared following the method disclosed in Gibson (Gibson V. C., in J. Am. Chem. Soc., 121, 8728, 1999).

Elemental analysis of (C$_{33}$H$_{43}$N$_3$) gave the following results:
predicted: % C=82.32; % H=8.94; % N=8.73.
measured: % C=82.11; % H=8.91; % N=8.69.
$^1$H NMR (CDCl$_3$): δ 8.52 (d, 2H, $^3$J (HH)=7.8 Hz, Py-H$_m$), 7.94 (t, 1H, Py-H$_p$), 7.1 (m, 6H, Ar—H), 2.78 (sept, 4H, $^3$J (HH)=5.6 Hz, CHMe$_2$), 2.28 (s, 6H, N═CMe), 1.18 (d, 24H, CHMe$_2$).

Blue C4 complex of 2,6-bis[1-2,6-bis(isopropyl)phenyl) imido)ethyl]pyridine Fe(II) dichloride, prepared from the ligand here-above was obtained following the method described in Gibson also.

Elemental analysis of (C$_{33}$H$_{43}$N$_3$FeCl$_2$) gave the following results:
predicted: % C=64.19; % H=7.18; % N=6.8%.
measured: % C=64.19; % H=6.9; % N=6.7.

EXAMPLE 30

Activation of Complex C4 with MAO

In a 1 L balloon, conditioned under argon, to 300 mL of heptane, 1.17 mL of MAO solution (Albemarle, 10 wt % in toluene) were added. 5 mL of a suspension of complex C4, (1.046 M in toluene), corresponding to 15 μmol/L and a Al/Fe ratio of 333, were syringed in the balloon.

The yellow medium was kept under manual stirring during a period of time of 5 minutes at room temperature (about 25° C.) and then syringed into a 500 mL Büchi type reactor.

The polymerisation was carried out at a temperature of 50° C. under a pressure of ethylene of 3 bars and during a period of time of 25 minutes.

The polymer was filtered, washed with methanol and dried under vacuum. 24.29 g of polymer were obtained corresponding to an activity of 1.1 10$^7$ g/mol$_{Fe}$/h and it had the following characteristics:
Mw=250 000
D=27.1
Tm=136° C.
crystallinity=46%
no morphology.

EXAMPLE 31

Activation of Complex C4 with TIBAL

In a 1 L balloon conditioned under argon, to 300 mL of heptane, 0.34 mL of a solution of TIBAL (1.024 M in heptane) were added. 5 mL of a suspension of complex C4 (1.046 mM in toluene), corresponding to 15 μmol/L and a Al/Fe ratio of 67 were syringed in the balloon.

The yellow medium was kept under manual stirring during a period of time of 5 minutes at room temperature (about 25° C.) and then syringed into a 500 mL Büchi type reactor.

The polymerisation was carried out at a temperature of 50° C. under a pressure of ethylene of 3 bars and during a period of time of 30 minutes.

No ethylene was consumed during that period of time.

EXAMPLE 32

Activation of Complex C4 with TIBAL and Support S1

In a 50 mL balloon, conditioned under argon, 191 mg of support S1 were weighted. In a 1 L balloon, conditioned under argon, to 300 mL of heptane, 0.35 mL of TIBAL solution (1.024 M in heptane) were added. One part of that solution corresponding to 1 mmol of TIBAL per liter was used to suspend the 191 mg of support S1. 1 mL of a suspension of complex C4, (1.784 mM in toluene), corresponding to 5 μmol/L, was syringed in the balloon.

The medium was kept under manual stirring during a period of time of 5 minutes at room temperature (about 25° C.) and then syringed into a 500 mL Büchi type reactor.

The polymerisation was carried out at a temperature of 50° C. under a pressure of ethylene of 3 bars and during a period of time of 60 minutes.

The polymer was filtered, washed with methanol and dried under vacuum. 11 g of polymer were obtained corresponding to an activity of 58 g/g$_{support}$/h and it had the following characteristics:
Mw=362 000
D=13.2
Tm=137° C.
crystallinity=56%
no morphology.

EXAMPLE 33

Activation of Complex C4 with TIBAL and Support S2

In a 50 mL balloon, conditioned under argon, 202 mg of support S2 were weighted.

In another balloon, conditioned under argon, 2 mL of a blue suspension of complex c4 (1.784 mM in toluene), corresponding to 3.6 µmol of Fe were mixed with 0.7 mL of TIBAL solution (1.024 M in heptane). 1.31 mL of that yellow solution was poured over support S2: the supernatant was colorless and the support turned yellow.

In a 1 L balloon conditioned under argon, and containing 300 mL of heptane, the support and supernatant were syringed.

The medium was kept under manual stirring during a period of time of 5 minutes at room temperature (about 25° C.) and then syringed into a 500 mL Büchi type reactor.

The polymerisation was carried out at a temperature of 50° C. under a pressure of ethylene of 3 bars and during a period of time of 60 minutes.

Figure 6:
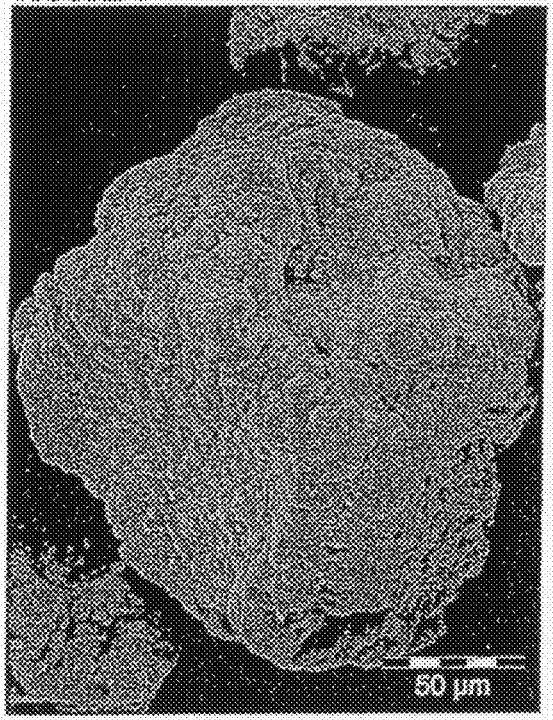
FIG. 6 represents the morphology of polyethylene prepared according to example 32.

The polymer was filtered, washed with methanol and dried under vacuum. 1 g of polymer were obtained corresponding to an activity of 5 g/g$_{support}$/h and it had the following characteristics:
Mw=926000
D=7.4
Tm=137° C.
crystallinity=46%
morphology represented in FIG. 6.

EXAMPLE 34

Activation of Complex C4 with TEAL and Support S2

In a 50 mL balloon, conditioned under argon, 222 mg of support S2 were weighted.

In another balloon, conditioned under argon, 2 mL of a blue suspension of complex c4 (1.784 mM in toluene), corresponding to 3.6 µmol of Fe were mixed with 0.45 mL of TEAL solution (1.623 M in heptane). 1.23 mL of that yellow solution was poured over support S2: the supernatant was colorless and the support turned yellow. In a 1 L balloon conditioned under argon, and containing 300 mL of heptane, the support and supernatant were syringed.

The medium was kept under manual stirring during a period of time of 5 minutes at room temperature (about 25° C.) and then syringed into a 500 mL Büchi type reactor.

The polymerisation was carried out at a temperature of 50° C. under a pressure of ethylene of 3 bars and during a period of time of 60 minutes.

Figure 7:
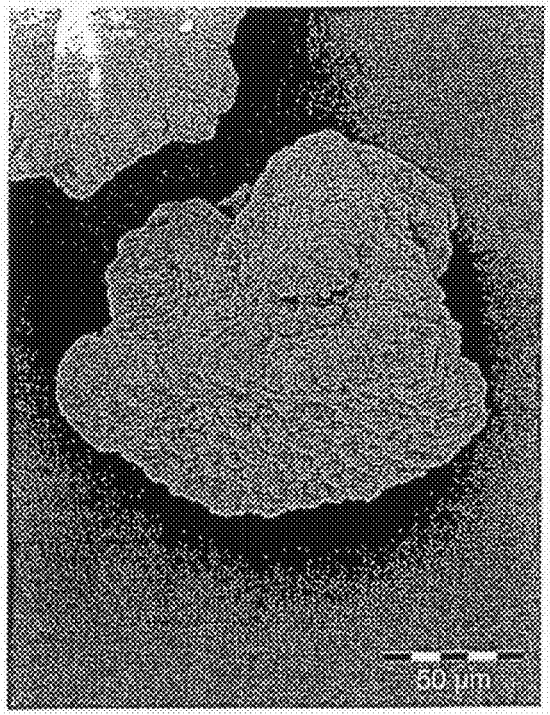
FIG. 7 represents the morphology of polyethylene prepared according to example 33.

The polymer was filtered, washed with methanol and dried under vacuum 0.9 g of polymer were obtained corresponding to an activity of 4 g/g$_{support}$/h and it had the following characteristics:
Mw=960000
D=16.6
Tm=139° C.
crystallinity=42%
morphology represented in FIG. 7.

The polydispersities of the polymers prepared in examples 30 to 34 are represented in FIG. 8.

EXAMPLE 35

Preparation of Complex C5

In a Schlenk, conditioned under argon, 1.006 g of ligand 2,6-bis[1-(2,6-bis (isopropyl)phenyl)imido)ethyl]pyridine, used in example 29 for the preparation of complex C4 were placed: this corresponds to 2.08 mmol that were dissolved with 30 mL of tetrahydrofuran (THF) distilled over Na/benzophenone.

In a 50 mL balloon, 299.7 mg of complex FeCl3 (Aldrich, anhydrous) were placed and solubilised with 10 mL of THF. The resulting solution was orange.

That solution was syringed in the Schlenk containing the ligand solution. The resulting solution turned instantaneously dark red.

That solution was kept under stirring during a period of time of 3 hours. THF was vaporised under dry conditions and the resulting powder was washed 3 times with 10 mL of pentane dried over Na. The powder was then dried under vacuum during a period of time of 4 hours. 1.256 g of 2,6-bis [1-(2,6-bis (isopropyl)phenyl)imido)ethyl]pyridine Fe(II) trichloride were obtained.

Elemental analysis of ($C_{33}H_{43}Cl_3FeN_3$) gave the following results:
predicted: % C=61.55; % H=6.73; % N=6.53; % Cl=16.52; % Fe=8.67.
measured: % C=61.8; % H=6.6; % N=6.5; % Cl=16.58; % fe=8.65.

EXAMPLE 36

Activation of Complex C5 with MAO

In a 1 L balloon, conditioned under argon, to 325.91 mL of heptane, 1.1 mL of MAO solution (Albemarle, 10 wt % in toluene) were added. 3.5 mL of a suspension of complex C5, (1.378 M in toluene), corresponding to 15 µmol/L and a Al/Fe ratio of 333, were syringed in the balloon.

The yellow medium was kept under manual stirring during a period of time of 5 minutes at room temperature (about 25° C.) and then syringed into a 500 mL Büchi type reactor.

The polymerisation was carried out at a temperature of 50° C. under a pressure of ethylene of 3 bars and during a period of time of 16 minutes.

The polymer was filtered, washed with methanol and dried under vacuum. 20.43 g of polymer were obtained corresponding to an activity of 2.6 $10^7$ g/mol$_{Fe}$/h and it had the following characteristics:
Mw=250 000
D=27.1
Tm=137° C.
crystallinity=75%
no morphology.

EXAMPLE 37

Activation of Complex C5 with TIBAL

In a 1 L balloon conditioned under argon, to 341.28 mL of heptane, 0.3 mL of a solution of TIBAL (1.024 M in heptane)

were added. 3.7 mL of a suspension of complex C5 (1.378 mM in toluene), corresponding to 15 µmol/L and a Al/Fe ratio of 67 were syringed in the balloon.

The yellow medium was kept under manual stirring during a period of time of 5 minutes at room temperature (about 25° C.) and then syringed into a 500 mL Büchi type reactor.

The polymerisation was carried out at a temperature of 50° C. under a pressure of ethylene of 3 bars and during a period of time of 75 minutes.

The polymer was filtered, washed with methanol and dried under vacuum. 4.05 g of polymer were obtained with an activity of $9.9410^5$ g PE/mol Fe/h and it had the following characteristics:
Mw=277000
D=12.5
Tm=137° C.
crystallinity=73%
no morphology.

EXAMPLE 38

Activation of Complex C5 with TEAL and Support S2

In a 50 mL balloon, conditioned under argon, 133 mg of support S2 were weighted.

In a 1 L balloon conditioned under argon, to 333.53 mL of heptane, 0.67 mL of a solution of TEAL (1.517 M in heptane) was added. A part of that solution, corresponding to 3 mmol of TEAL per liter, were used to suspend the 133 mg of support S2.

3.52 mL of a solution of complex C5 (1.356 M in toluene), corresponding to 15 µmol/L were syringed in the balloon.

Support S2 turned yellow. The supernatant was colorless and remained colorless during polymerisation.

The medium was kept under manual stirring during a period of time of 5 minutes at room temperature (about 25° C.) and then syringed into a 500 mL Büchi type reactor.

The polymerisation was carried out at a temperature of 50° C. under a pressure of ethylene of 3 bars and during a period of time of 130 minutes.

The polymer was filtered, washed with methanol and dried under vacuum. 1.2 g of polymer were obtained corresponding to a productivity of 5 $g/g_{support}$ and it had the following characteristics:
Mw=938000
D=39
Tm=137° C.
crystallinity=53%
morphology represented in FIG. 9.

EXAMPLE 39

Activation of Complex C5 with TIBAL and Support S2

In a 50 mL balloon, conditioned under argon, 117 mg of support S2 were weighted.

In a 1 L balloon conditioned under argon, to 318 mL of heptane, 0.78 mL of a solution of TIBAL (1.217 M in heptane) was added. A part of that solution, corresponding to 3 mmol of TIBAL per liter, were used to suspend the 117 mg of support S2.

3.69 mL of a solution of complex C5 (1.356 M in toluene), corresponding to 15 µmol/L were syringed in the balloon.

Support S2 turned yellow. The supernatant was colorless and remained colorless during polymerisation.

The medium was kept under manual stirring during a period of time of 5 minutes at room temperature (about 25° C.) and then syringed into a 500 mL Büchi type reactor.

The polymerisation was carried out at a temperature of 50° C. under a pressure of ethylene of 3 bars and during a period of time of 60 minutes.

The polymer was filtered, washed with methanol and dried under vacuum. 0.8 g of polymer were obtained corresponding to a productivity of 6 $g/g_{support}$ and it had the following characteristics:
Mw=847000
D=11
Tm=138° C.
crystallinity=50%
morphology represented in FIG. 10.

EXAMPLE 40

Preparation of Complex C6

C6 complex was prepared according the protocol described by Fujita and al., in *Chemistry Letter*, 1999, 1263.

EXAMPLE 41

Activation of Complex C6 with S2 Support and TIBAL

A 125 mL stainless steel autoclave purged with nitrogen was charged with 80 mL of liquid isobutane at 50° C. 1.21 g of 1-hexene was injected in the reactor in order to reach 2.44% by weight of overall composition; ethylene was allowed to saturate the liquid phase and the gas phase until the overall pressure reached 12.6 bar. In a glove box, 0.82 mL of TiBAL (10% solution by weight in hexane) were added to a yellow solution of C6 complex (1.12 mg of C6 in 6 mL of dry toluene). 1.7 mL of this yellow solution was added to 51.00 mg of S2 support. The overall suspension was injected into the reactor.

The polymerisation was carried out at a temperature of 50° C. under a pressure of 12.6 barg and during a period of time of 60 minutes. 0.6 g of polymer were obtained corresponding to a productivity of 12 g/g support. The polymer had the following characteristics:
Mw>4.5.106 Daltons
Tm=130° C.

EXAMPLE 42

Activation of Complex C6 with S2 Support and TEAL

A 125 mL stainless steel autoclave purged with nitrogen was charged with 80 mL of liquid isobutane at 50° C. 1.2 g of 1-hexene was injected into the reactor in order to reach 2.44% by weight of the overall composition; ethylene was allowed to saturate the liquid phase and the gas phase until the overall pressure reached 12.6 bar. In a glove box, 1.55 mL of TEAl (10% solution by weight in hexane) were added to a yellow suspension of C6 complex (1.11 mg of C6 in 6 mL of dry toluene). 1.9 mL of this yellow solution was added to 50.96 mg of S2 support. The overall suspension was injected into the reactor.

The polymerisation was carried out at a temperature of 50° C. under a pressure of 12.6 barg and during a period of time of 60 minutes. 1.4 g of polymer were obtained corresponding to a productivity of 27 g/g support. The polymer had the following characteristics:
Mw>4.5.106 Daltons
Tm=131.7° C.
Crystallinity=72%
Density=0.955 g/cm³

EXAMPLE 43

Activation of Complex C6 with S2 Support and DEZ

A 125 mL stainless steel autoclave purged with nitrogen was charged with 80 mL of liquid isobutane at 50° C. 1-hexene was injected into the reactor in order to reach 2.44% by weight of overall composition; ethylene was allowed to saturate the liquid phase and the gas phase until overall pressure reached 12.6 bar. In a glove box, 0.6 mL of DEZ (1 M solution in hexane) were added to a yellow solution of C6 complex (1.00 mg of C6 in 6 mL of dry toluene). 1.65 mL of this brown solution was added to 50.89 mg of S2 support. The overall suspension was injected into the reactor.

The polymerisation was carried out at a temperature of 50° C. under a pressure of 12.6 barg and during a period of time of 60 minutes. 0.4 g of polymer were obtained corresponding to a productivity of 10 g/g support. The polymer had the following characteristics:
Mn=1400 Daltons
Mw/Mn=250
Tm=129.8° C.
Crystallinity=60%
Density=0.941 g/cm³

EXAMPLE 44

Activation of Complex C1 with S2 Support and TEAL

In a 50 mL Schlenck conditioned under argon, 0.4 mL of a solution of 1 M TEA in heptane was added to a 0.55 mL solution of complex C1 in toluene (C1 solution at [Ni]=2.7 mM). In a 50 mL balloon conditioned under argon, this blue solution was added to 110 mg of support S2; S2 support turned blue and the remaining liquid was colorless. The full suspension was syringed in a first 1 L balloon conditioned under argon with 300 mL of heptane In another 1 L balloon, conditioned under argon, 300 mL of heptane were added to which the content of the first balloon was syringed. 10 mL of Butyl acrylate (dried on CaH2 during 5 days and distilled under vacuum) was added to this suspension. The suspension color turned from blue to yellow and then orange.

The medium was kept under manual stirring during a period of time of 5 minutes at room temperature (about 25° C.) and then syringed into a 1 L Büchi type reactor.

The polymerisation was carried out at a temperature of 25° C. under an ethylene pressure of 3 bars and during a period of time of 14 hours.

The polymer was filtered, washed with methanol and dried under vacuum. 842 mg of polymer were obtained corresponding to an activity of 0.6 $g/g_{support}/h$ and it had a level of butylacrylate of 55% by weight.

The invention claimed is:

1. An active supported catalyst system comprising:
one or more non-metallocene coordinating complexes represented by general formula

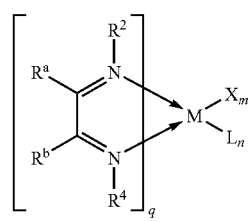

wherein M is Ni or Pd; wherein $R^2$, $R^4$, $R^a$, $R^b$ are each independently selected from hydrogen, halogen, substituted or unsubstituted hydrocarbyl, substituted or unsubstituted heterohydrocarbyl or $SiR'_3$, wherein R' is independently selected from hydrogen, halogen, substituted or unsubstituted hydrocarbyl and substituted or unsubstituted heterohydrocarbyl and any adjacent R's may be joined together to form a ring; X represents an atom or group covalently or ionically bound to the transition metal M; L is a group datively bound to M; n is an integer from 0 to 5, m is 1 to 3 and q is 1 or 2,
an alkylating agent selected from organo-metallic compounds having at least one carbon-metal bond; and
an activating functionalised and fluorinated support.

2. The active supported catalyst system of claim 1, wherein the activating support is prepared by:
a) providing a support prepared from one or more porous mineral oxides;
b) optionally heating the support under inert gas;
c) functionalising the support with a solution containing an alkylating agent;
d) heating the functionalised support of step c) under an inert gas and then under oxygen;
e) fluorinating the support with a solution containing a fluorinating agent; and
f) retrieving an active fluorinated support.

3. The active supported catalyst system of claim 2 wherein functionalisation and the fluorination are carried out in one step with an agent containing at least one aluminum, one fluorine and an organic group.

4. The active supported catalyst system of claim 2 wherein the functionalisation agent is $Al(R')_2F$, wherein the R' groups can be the same or different and are alkyl groups having from 1 to 20 carbon atoms.

5. The active supported catalyst system of claim 1 wherein the alkylating agent is aluminium alkyl or diethyl zinc.

6. An active supported catalyst system comprising:
one or more non-metallocene coordinating complexes represented by general formula

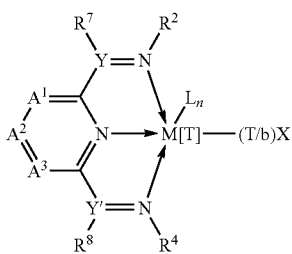

wherein $R^2$ and $R^4$ are each independently selected from hydrogen, halogen, substituted or unsubstituted hydrocarbyl, substituted or unsubstituted heterohydrocarbyl and $SiR'_3$, wherein $R'$ is independently selected from hydrogen, halogen, substituted or unsubstituted hydrocarbyl or substituted or unsubstituted heterohydrocarbyl and any adjacent R's may be joined together to form a ring; X represents an atom or group covalently or ionically bound to the transition metal M; L is a group datively bound to M; n is an integer from 0 to 5; M is Fe or Co; T is the oxidation state of the transition metal; b is the valence of the atom or group X; Y and Y'are independently C or $P(R^3)$, $R^3$ is hydrogen, halogen, substituted or unsubstituted hydrocarbyl, substituted or unsubstituted heterohydrocarbyl or $SiR'_3$, $A^1$, at least one of $A^2$ and $A^3$ is $CR^9$ and the remaining $A^2$ or $A^3$ is N, P or $CR^9$; wherein $R^7$, $R^8$ and $R^9$ are each independently selected from hydrogen, halogen, substituted or unsubstituted hydrocarbyl, substituted or unsubstituted heterohydrocarbyl or $SiR'_3$, an alkylating agent selected from organo-metallic compounds having at least one carbon-metal bond; and an activating functionalized and fluorinated support.

7. The active supported catalyst system of claim 6, wherein the activating support is prepared by:
   a) providing a support prepared from one or more porous mineral oxides;
   b) optionally heating the support under inert gas;
   c) functionalising the support with a solution containing an alkylating agent;
   d) heating the functionalised support of step c) under an inert gas and then under oxygen;
   e) fluorinating the support with a solution containing a fluorinating agent; and
   f) retrieving an active fluorinated support.

8. A method for polymerising non polar or polar monomers comprising:
   a) introducing an active supported catalyst system into a reaction zone, wherein the active supported catalyst system comprises:
   one or more non-metallocene coordinating complexes represented by general formula:

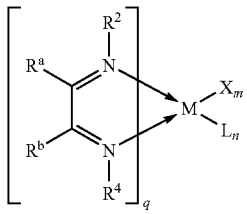

wherein M is Ni or Pd; wherein $R^2$, $R^4$, $R^a$, $R^b$ are each independently selected from hydrogen, halogen, substituted or unsubstituted hydrocarbyl, substituted or unsubstituted heterohydrocarbyl or $SiR'_3$, wherein $R'$ is independently selected from hydrogen, halogen, substituted or unsubstituted hydrocarbyl and substituted or unsubstituted heterohydrocarbyl and any adjacent R's may be joined together to form a ring; X represents an atom or group covalently or ionically bound to the transition metal M; L is a group datively bound to M; n is an integer from 0 to 5, m is 1 to 3 and q is 1 or 2,
   an alkylating agent selected from organo-metallic compounds having at least one carbon-metal bond; and
   an activating functionalised and fluorinated support;
   b) injecting a non polar or a polar monomer into the reacting zone;
   c) contacting the monomer with the active supported catalyst to form polymer; and
   d) retrieving a polymer from the reaction vessel.

9. The method of claim 8 wherein the polymerisation is carried out a temperature of from 0 to 100° C. and under a pressure of up to 100 bar.

10. The method of claim 8 wherein the monomer is ethylene or propylene.

11. The method of claim 10, wherein the monomer further comprises hexene.

12. A method for polymerising non polar or polar monomers comprising:
   a) introducing an active supported catalyst system into a reaction zone, wherein the active supported catalyst system comprises:
   one or more non-metallocene coordinating complexes represented by general formula

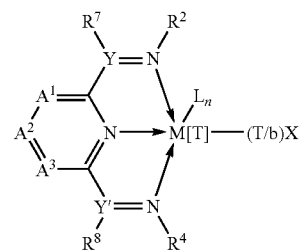

wherein $R^2$ and $R^4$ are each independently selected from hydrogen, halogen, substituted or unsubstituted hydrocarbyl, substituted or unsubstituted heterohydrocarbyl and $SiR'_3$, wherein $R'$ is independently selected from hydrogen, halogen, substituted or unsubstituted hydrocarbyl or substituted or unsubstituted heterohydrocarbyl and any adjacent R's may be joined together to form a ring; X represents an atom or group covalently or ionically bound to the transition metal M; L is a group datively bound to M; n is an integer from 0 to 5; M is or Co; T is the oxidation state of the transition metal; b is the valence of the atom or group X; Y and Y' are independently C or $P(R^3)$, $R^3$ is hydrogen, halogen, substituted or unsubstituted hydrocarbyl, substituted or unsubstituted heterohydrocarbyl or $SiR'_3$, $A^1$, at least one of $A^2$ and $A^3$ is $CR^9$ and the remaining $A^2$ or $A^3$ is N, P or $CR^9$; wherein $R^7$, $R^8$ and $R^9$ are each independently selected from hydrogen, halogen, substituted or unsubstituted hydrocarbyl, substituted or unsubstituted heterohydrocarbyl or $SiR'_3$, an alkylating agent selected from organo-metallic compounds having at least one carbon-metal bond; and
an activating functionalised and fluorinated support;
b) injecting a non polar or a polar monomer into the reacting zone;
c) contacting the monomer with the active supported catalyst to form polymer; and
d) retrieving a polymer from the reaction vessel.

* * * * *